United States Patent
Labbe et al.

(10) Patent No.: US 11,979,031 B2
(45) Date of Patent: May 7, 2024

(54) DEVICE FOR TRANSMITTING POWER CONTACTLESSLY THROUGH RESONANT INDUCTIVE COUPLING FOR RECHARGING A MOTOR VEHICLE

(71) Applicant: VALEO EQUIPEMENTS ELECTRIQUES MOTEUR, Creteil (FR)

(72) Inventors: Nicolas Labbe, St Quentin Fallavier (FR); Gaetan Didier, Creteil (FR); Denis Netter, Creteil (FR); Julien Fontchastagner, Creteil (FR); Noureddine Takorabet, Creteil (FR); Hamidreza Zandi, Creteil (FR)

(73) Assignee: VALEO EQUIPEMENTS ELECTRIQUES MOTEUR, Creteil (FR)

(*) Notice: Subject to any disclaimer, the term of this patent is extended or adjusted under 35 U.S.C. 154(b) by 137 days.

(21) Appl. No.: 17/436,870

(22) PCT Filed: Mar. 13, 2020

(86) PCT No.: PCT/EP2020/056867
§ 371 (c)(1),
(2) Date: Sep. 7, 2021

(87) PCT Pub. No.: WO2020/187747
PCT Pub. Date: Sep. 24, 2020

(65) Prior Publication Data
US 2022/0131415 A1    Apr. 28, 2022

(30) Foreign Application Priority Data

Mar. 15, 2019 (FR) ...................................... 1902663
Jul. 25, 2019 (FR) ...................................... 1908453
(Continued)

(51) Int. Cl.
*H02J 50/12* (2016.01)
*B60L 53/122* (2019.01)
(Continued)

(52) U.S. Cl.
CPC ............ *H02J 50/12* (2016.02); *B60L 53/122* (2019.02); *H01F 27/28* (2013.01); *H02J 50/402* (2020.01)

(58) Field of Classification Search
CPC ...... H02J 50/12; H02J 50/402; H02J 2310/48; H02J 50/502; B60L 53/122; B60L 53/38;
(Continued)

(56) References Cited

U.S. PATENT DOCUMENTS

2016/0013657 A1   1/2016   Jeong et al.
2016/0254702 A1   9/2016   Akuzawa et al.
(Continued)

FOREIGN PATENT DOCUMENTS

JP    2009-106136 A    5/2009
WO   WO 2015/097809 A1   7/2015

OTHER PUBLICATIONS

Simple Parallel (Tank Circuit) Resonance, https://www.allaboutcircuits.com/textbook/alternating-current/chpt-6/parallel-tank-circuit-resonance/ Apr. 28, 2016 (Year: 2016).*
(Continued)

*Primary Examiner* — Lincoln D Donovan
*Assistant Examiner* — Alex W Lam
(74) *Attorney, Agent, or Firm* — Oblon, McClelland, Maier & Neustadt, L.L.P.

(57) ABSTRACT

Transmitter or receiver resonant circuit for carrying out contactless power transmission via resonant inductive coupling to a receiver or transmitter resonant circuit, comprising a first capacitance and a first winding, the first winding comprising an inductance and a first resistance, the trans-
(Continued)

mitter resonant circuit comprising a second capacitance of value C2' and a second winding, the second winding comprising a second inductance of value L2' and a second resistance of value R2', the transmitter resonant circuit having a natural angular frequency u>2 such that w2=1/√(L2'×C2') and a natural frequency f2 such that f2=w2/(2π), characterized in that the value of the second inductance varies in a predetermined manner.

19 Claims, 3 Drawing Sheets

(30) Foreign Application Priority Data

| | | | |
|---|---|---|---|
| Jul. 25, 2019 | (FR) | ........................ | 1908454 |
| Jul. 25, 2019 | (FR) | ........................ | 1908455 |
| Jul. 25, 2019 | (FR) | ........................ | 1908456 |

(51) Int. Cl.
*H01F 27/28* (2006.01)
*H02J 50/40* (2016.01)

(58) Field of Classification Search
CPC .......... H01F 27/28; H01F 38/14; H01F 38/18; Y02T 10/70; Y02T 10/7072; Y02T 90/12; Y02T 90/14; H02M 7/48
See application file for complete search history.

(56) References Cited

U.S. PATENT DOCUMENTS

2017/0005524 A1  1/2017  Akuzawa et al.
2018/0109149 A1* 4/2018  Murayama ............ B60L 53/122

OTHER PUBLICATIONS

Japanese Office Action dated Aug. 26, 2022 in Japanese Patent Application No. 2021-555568 (with English translation), 8 pages.
International Search Report dated May 6, 2020 in PCT/EP2020/056867 filed on Mar. 13, 2020, 2 pages.
James, J. et al., "A Variable Inductor Based Tuning Method for ICPT Pickups,"Power Engineering Conference, 2005, IPEC 2005, 5 total pages, XP031330795.

* cited by examiner

DEVICE FOR TRANSMITTING POWER CONTACTLESSLY THROUGH RESONANT INDUCTIVE COUPLING FOR RECHARGING A MOTOR VEHICLE

The present invention relates to a, transmitter or receiver, resonant circuit and to a device for contactlessly transmitting power via resonant inductive coupling with a view to charging or recharging a motor vehicle or any type of vehicle propelled by means of electrical power.

As known per se, it is technically possible to supply, via contactless transmission, a motor vehicle or any other object provided with a device for storing electrical energy, with a power comprised between 3 and 10 kW, when this object is stopped (static charging being spoken of in this case) or when it is moving (dynamic charging then being spoken of). This supply via contactless transmission is then achieved by means of distant electrical circuits that are magnetically coupled and tuned to the same frequency. The magnetically coupled circuits each comprise at least one resonant LC element, L and C denoting inductances and capacitances respectively.

The problem with this type of solution is that to transmit a satisfactory power level, in particular several kW, it is necessary to operate at high frequencies, in particular of the order of 85 kHz or more, as regards the working frequency and the natural frequency of each resonant circuit. Furthermore, this type of solution requires a small distance between the resonant elements located in the source and in the load.

Operation at such a high frequency level mainly results in a need to use expensive components such as soft ferrites and Litz wire the strands of which are very small in cross section, and for example smaller than or equal to 0.07 mm in diameter.

The aim of the invention is to at least partly mitigate these drawbacks.

To this end, a first subject of the invention relates to a first resonant circuit, in particular a transmitter or receiver, for carrying out contactless power transmission via resonant inductive coupling to a second resonant circuit, in particular a transmitter or receiver, comprising a first capacitance and a first winding, the first winding comprising an inductance and a first resistance, the first resonant circuit comprising a second capacitance of value $C2'$ and a second winding,
the second winding comprising a second inductance of value $L2'$ and a second resistance of value $R2'$,
the first resonant circuit having a natural angular frequency $\omega 2$ such that $\omega 2 = 1/\sqrt{(Leq \times C2')}$, Leq being the equivalent inductance of the first resonant circuit, and a natural frequency $f2$ such that $f2 = \omega 2/(2\pi)$,
characterized in that the equivalent-inductance inductance value Leq, in particular the second inductance L2, varies in a predetermined manner.

The invention makes it possible to increase the amplitude of an electric strike current delivered by the first resonant circuit, in particular a transmitter, to the second resonant circuit, in particular a receiver, when the transmitter first resonant circuit is magnetically coupled to the second resonant circuit, which is in particular a receiver.

According to one aspect of the invention, Leq is equal to $L2'$. $\omega 2 = 1/\sqrt{(L2' \times C2')}$.

According to one implementation of the invention, the first resonant circuit is a transmitter resonant circuit and the second resonant circuit is a receiver resonant circuit.

According to one implementation of the invention, the first resonant circuit is a receiver resonant circuit and the second resonant circuit is a transmitter resonant circuit.

According to one implementation, the second inductance comprises a magnetic circuit.

According to one implementation, the inductance value of the second inductance varies via variation in the reluctance of the magnetic circuit of the second inductance.

According to one implementation, the magnetic circuit of the second inductance comprises at least one portion that is movable relative to the second winding.

According to one implementation, the magnetic circuit of the second inductance comprises at least one portion that is fixed relative to the second winding.

According to one implementation, the fixed portion and the movable portion comprise a ferromagnetic or ferrimagnetic material.

According to one implementation, the movable portion is set in motion so that protrusions are located alternately facing other protrusions or between two protrusions.

According to one implementation, the movable portion of the magnetic circuit of the second inductance is driven by an electric motor.

According to one implementation, the second inductance is made in one piece.

According to one implementation, the second inductance comprises a solenoid, in particular of substantially flattened shape.

According to one implementation, the inductance value of the second inductance varies at a predetermined frequency and with a predetermined amplitude hL of variation in inductance about a mean value $L2moy$, so that the natural angular frequency varies with a predetermined amplitude $h\omega$ of variation in angular frequency about a mean value $\omega 2moy$, with $\omega 2moy = 1/\sqrt{(L2moy \times C2')}$.

The invention thus makes it possible to amplify the amplitude of the current and voltage in the first resonant circuit, which is in particular a transmitter, with an amplification gain high enough to allow operation at a lower frequency, and/or at a larger distance.

According to one implementation, the predetermined frequency is chosen so as to increase the amplitude of the electrical current flowing through the first resonant circuit, which is in particular a transmitter, exponentially.

The invention thus makes it possible, via the introduction of an amplification gain, to transmit using a contactless method a satisfactory level of power between a transmitter resonant circuit and a receiver resonant circuit, despite the use of a frequency of very low level with respect to the prior art.

According to one implementation, the second capacitance has a substantially constant value.

According to one implementation, the first resonant circuit and/or the second resonant circuit are arranged to transmit a power comprised between 1 kW and 500 kW, and in particular between 1 kW and 150 kW.

According to one implementation, the first resonant circuit, in particular a transmitter or receiver, is arranged to be tuned to the second resonant circuit, in particular a transmitter or receiver. Consequently, the first resonant circuit and the transmitter second resonant circuit have substantially the same natural frequency.

According to one implementation, the predetermined frequency is equal to twice the natural frequency of the first resonant circuit, which is in particular a transmitter, to within a tolerance.

Such a predetermined frequency makes it possible to increase the amplitude of the electrical current flowing through the first resonant circuit, which is in particular a transmitter.

According to one implementation, the tolerance ε is such that $\varepsilon=\sqrt{((1/2)\times hL\times\omega 2moy)^2-(R2'/L2')^2}$.

Thus, the predetermined frequency is comprised between $(2\times f2)-\varepsilon$ and $(2\times f2)+\varepsilon$.

According to one implementation, the predetermined amplitude hω of variation in angular frequency is strictly greater than $2\times(R2'/L2')\times C2')$.

According to one implementation, the second inductance is formed by a variable-magnetic-reluctance assembly comprising a rotor and a stator with a gap between them,
the stator comprising a solenoid and a plurality of stator arms, all of the stator arms together forming a single magnetic pole when the solenoid is passed through by an electrical current, the pole in particular being considered from the side of the gap,
the rotor comprising a plurality of rotor arms forming a single magnetic pole when the solenoid is passed through by an electrical current, the pole in particular being considered from the side of the gap.

According to one implementation, two adjacent rotor arms are separated pairwise by an amagnetic segment.

According to one implementation, two adjacent stator arms are separated pairwise by an amagnetic segment.

According to one implementation, the number of stator arms is equal to the number of rotor arms.

As a variant, the number of stator arms is different from the number of rotor arms.

According to one implementation, each stator arm extends in a radial direction with respect to the axis of rotation of the rotor and comprises a bundle of laminated magnetic sheets that are in particular stacked in an orthoradial direction with respect to the radial direction in which the stator arm extends.

According to one implementation, the stack is stacked in an orthoradial direction with respect to the axis of rotation of the rotor.

As a variant, the stacking is carried out in a direction parallel to the axis of rotation of the rotor.

According to one implementation, each rotor arm extends in a radial direction with respect to the axis of rotation of the rotor and comprises a bundle of laminated magnetic sheets that are in particular stacked in an orthoradial direction with respect to the radial direction in which the rotor arm extends.

According to one implementation, the stack is stacked in an orthoradial direction with respect to the axis of rotation of the rotor.

As a variant, the stacking is carried out in a direction parallel to the axis of rotation of the rotor.

According to one implementation, the rotor comprises an amagnetic shaft.

This allows the flux to pass only through the rotor arms and not through the shaft, in an axial direction.

According to one implementation, each rotor arm comprises a projecting segment, in particular placed radially on the side of the axis of rotation of the rotor.

This allows the rotor arms to be held securely on the shaft and makes it possible to limit flux leakage by channeling the magnetic flux generated by an external magnetic source.

According to one implementation, the solenoid comprises a flat turn, or a plurality of turns extending concentrically and/or extending axially, the turns in particular being devoid of Litz wire.

According to one implementation, the solenoid is arranged so that an alternating current flowing in the turns is strictly lower than 3 kHz.

According to one implementation, the turns comprise Litz wire, the cross section of which has a diameter strictly larger than 0.2 mm, and in particular strictly larger than 0.3 mm.

This makes it possible to reduce the number of wires and therefore to greatly simplify the implementation of the solenoid.

According to one implementation, the rotor is coupled to a motor in order to allow it to be rotated in particular at a predetermined speed Ω, this speed being expressed in revolutions/s and being such that $\Omega=((2\times f2)\pm\varepsilon)/(N)$, N being the number of stator arms.

According to one implementation, the second capacitance comprises a polypropylene capacitor, in particular of at least 900 μF.

According to one implementation, the second inductance is formed by a solenoid and an electronic voltage inverter that are electrically connected in parallel.

According to one implementation, the electronic voltage inverter comprises power components, for example IGBTs forming at least two arms.

According to one implementation, the electronic voltage inverter delivers an AC voltage controlled by means of a DC control voltage.

According to one implementation, the DC control voltage is provided by a power supply able to deliver a power greater than or equal to the power to be transmitted via resonant inductive coupling.

According to one implementation, the first resonant circuit further comprises a control inductance of value L2f' connected in series with the second inductance.

The inductance value L2f' of the control inductance L2f varies in a predetermined manner.

According to one aspect of the invention, Leq is equal to L2'+L2f'. $\omega 2=1/\sqrt{((L2'+L2f')\times C2')}$.

According to one implementation, the control inductance is formed by an electronic voltage inverter in particular arranged to emulate the electrical behavior of the control inductance and the value of the inductance L2f'.

The invention makes it possible to increase the amplitude of an electric strike current delivered by the first resonant circuit, in particular a transmitter, to the second resonant circuit, in particular a receiver, when the first resonant circuit is magnetically coupled to the second resonant circuit.

According to one implementation, the electronic voltage inverter possesses two connection terminals across which the AC voltage is delivered, these two connection terminals being the two terminals between which the control inductance is emulated.

According to one implementation, the inductance value L2f' of the control inductance varies sinusoidally as a function of time about L2moy and with an angular frequency equal to 2×ω2moy, so as to increase the amplitude of the electrical current flowing through the second resonant circuit exponentially.

As a variant, the inductance value L2f' of the control inductance varies so that the square of the natural angular frequency ω2 varies sinusoidally as a function of time about (ω2moy)² and with an angular frequency equal to 2×ω2moy, so as to increase the amplitude of the electrical current flowing through the second resonant circuit exponentially.

In other words, according to the latter variant, the inductance value L2f' of the control inductance varies as a function of time according to $1/(C2'\times(\omega 2)^2)$, $(\omega 2)^2$ varying sinusoidally as a function of time and about the value $(\omega 2moy)^2$.

Another subject of the invention is a device for contactlessly transmitting power via resonant inductive coupling, in particular with a view to charging or recharging with electrical power a motor vehicle, comprising:
- a power source, in particular an AC power source,
- a second resonant circuit, forming a receiver resonant circuit, comprising a first capacitance and a first winding, the first winding comprising an inductance and a first resistance,
- a first resonant circuit such as described above, the transmitter first resonant circuit being energized by the power source. The first resonant circuit forms a transmitter resonant circuit.

Another subject of the invention is a device for contactlessly transmitting power via resonant inductive coupling, in particular with a view to charging or recharging with electrical power a motor vehicle, comprising:
- a power source, in particular an AC power source,
- a second resonant circuit, forming a transmitter resonant circuit, comprising a first capacitance and a first winding, the first winding comprising an inductance and a first resistance, the second circuit being energized by the power source,
- a first resonant circuit such as described above, the first resonant circuit forming a receiver resonant circuit.

A further subject of the invention is an assembly for contactlessly charging or recharging a motor vehicle, comprising:
- a device for contactlessly transmitting power via resonant inductive coupling such as described above,
- a rectifier, electrically connected to the resonant circuit forming the receiver circuit among the first and second resonant circuits, for rectifying an electrical current generated by the variation in the magnetic field generated by the resonant circuit forming the transmitter resonant circuit among the first and second resonant circuits,
- a device for storing electrical energy, which is charged by the rectifier.

The invention will be understood better on reading the following description and studying the accompanying figures. These figures are given only by way of illustration and do not limit the invention.

Figure 1:
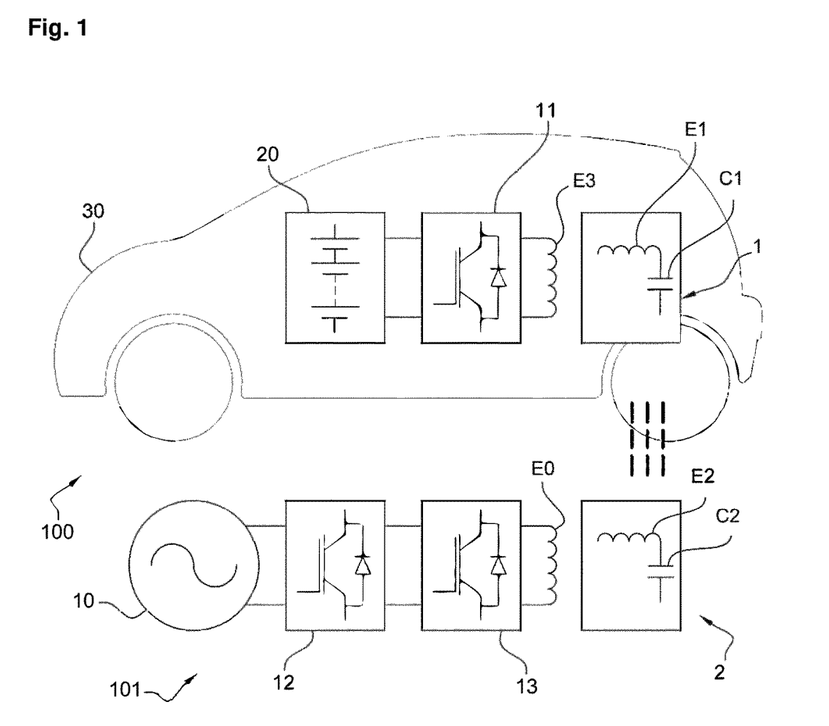
FIG. 1 is a schematic representation of an assembly for contactlessly charging or recharging a motor vehicle according to the invention.

As may be seen in FIG. 1, a motor vehicle 30 comprises a device 20 for storing electrical energy, in particular a battery 20, with a view to supplying electrical power to an electric traction motor (not shown) and to the on-board network of the motor vehicle 30. The battery 20 of the motor vehicle 30 for example has a nominal voltage of 48 V or 300 V and may be charged or recharged contactlessly using a device for contactlessly transmitting power via resonant inductive coupling 100.

In the example of FIG. 1, the device for contactlessly transmitting power via resonant inductive coupling 100 comprises an AC power source 10 that delivers power to a rectifier 12, the rectifier 12 being electrically connected to an inverter 13 that thus delivers AC power to a first resonant circuit, here forming a transmitter circuit 2, at a frequency higher than that of the source 10. As a variant, the power source 10 could operate at a directly usable frequency, there then being no need for a rectifier 12 and an inverter 13. In the example of FIG. 1, it is the winding E0 that is energized via a wired connection to the power source 10. This winding E0 then energizes the transmitter resonant circuit 2 via inductive coupling.

As a variant (not shown), the AC power source 10 could energize the transmitter resonant circuit 2 with AC directly.

In the example of FIG. 1, a second resonant circuit, here forming a receiver resonant circuit 1, comprises a first capacitance C1 and a first winding E1.

The device 100 for contactlessly transmitting power via resonant inductive coupling further comprises a transmitter resonant circuit 2 comprising a second capacitance C2 and a second winding E2.

When the receiver resonant circuit 1 is magnetically coupled to the transmitter resonant circuit 2, power is transmitted contactlessly via resonant inductive coupling to the transmitter resonant circuit 2. This magnetic coupling takes place when the first and second windings E1, E2 are close to each other. In the example in question, this coupling takes place when the first and second windings E1, E2 are substantially at a distance comprised between 10 cm and 1 m. In another example, the coupling takes place, even though performance is degraded, when the distance is comprised between 1 m and 10 m.

Figure 2:
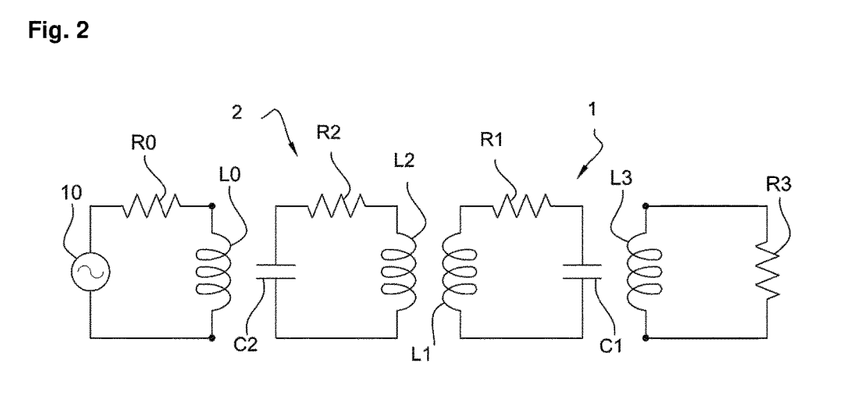
FIG. 2 is a schematic representation of a device for contactlessly transmitting power via resonant inductive coupling according to the invention.

As may be seen in FIG. 2, the power source 10 is connected to a resistance R0 in series with a transmission coil L0. Specifically, the winding E0 shown in FIG. 1 comprises the parasitic resistance R0 in series with a transmission coil L0. In FIG. 2, the rectifier 12 and the inverter 13 have not been shown for the sake of simplicity.

As may be seen in FIG. 2, the receiver resonant circuit 1 consists of an RLC circuit. Specifically, the receiver resonant circuit 1 comprises a first inductance L1 in series with a first resistance R1 and a first capacitance C1.

Specifically, the first winding E1 shown in FIG. 1 comprises the parasitic resistance R1 in series with the first inductance L1.

The transmission coil L0 is magnetically coupled to the first inductance L1.

The transmitter resonant circuit 2 consists of an RLC circuit. Specifically, the transmitter resonant circuit 2 comprises a second inductance L2 in series with a second resistance R2 and a second capacitance C2. Specifically, the second winding E2 shown in FIG. 1 comprises the parasitic resistance R2 in series with the first inductance L2.

The second capacitance C2 comprises a polypropylene capacitor, of at least 900 μF.

In the example shown, the receiver resonant circuit 1 and the transmitter resonant circuit 2 are tuned. The transmitter resonant circuit and the receiver resonant circuit thus have substantially the same natural frequency.

As may be seen in FIG. 2, a reception coil L3 is electrically connected to a resistance R3 schematically representing a parasitic resistance in series with the load formed by the rectifier 11 and the battery 20 of FIG. 1.

The winding E3 shown in FIG. 1 here comprises the parasitic resistance in series with the reception coil L3.

The reception coil L3 is magnetically coupled to the second inductance L2.

In the example of FIGS. 1 and 2, the transmitter resonant circuit 2 and the transmission coil L0 are located on the ground, whereas the receiver resonant circuit 1 and the reception coil L3 are located on board the vehicle.

In the example of FIGS. 1 and 2, the second capacitance has a value C2', the second inductance has a value L2', and the second resistance has a value R2'. In addition, the transmitter resonant circuit 2 has a natural angular frequency $\omega 2$ such that $\omega 2 = 1/\sqrt{(L2' \times C2')}$ and a natural frequency f2 such that $f2 = \omega 2/(2\pi)$.

The inductance value of the second inductance L2 varies in a predetermined manner.

More precisely, the inductance value of the second inductance L2 varies at a predetermined frequency and with a predetermined amplitude hL of variation in inductance about a mean value L2$moy$, so that the natural angular frequency varies with a predetermined amplitude h$\omega$ of variation in angular frequency about a mean value $\omega 2moy$, with $\omega 2moy = 1/\sqrt{(L2moy \times C2')}$.

The predetermined frequency is chosen so as to increase the amplitude of the AC electrical current flowing through the transmitter resonant circuit 2 exponentially.

The inductance value L2' of the second inductance L2 varies sinusoidally as a function of time about L2$moy$ and with an angular frequency equal to $2 \times \omega 2moy$, so as to increase the amplitude of the electrical current flowing through the receiver resonant circuit 1 exponentially.

As a variant, the inductance value L2' of the second inductance L2 varies so that the square of the natural angular frequency $\omega 2$ varies sinusoidally as a function of time about $(\omega 2moy)^2$ and with an angular frequency equal to $2 \times \omega 2moy$, so as to increase the amplitude of the electrical current flowing through the receiver resonant circuit 1 exponentially.

In other words, according to this variant, the inductance value L2' of the second inductance varies as a function of time according to $1/(C2' \times (\omega 2)^2)$, $(\omega 2)^2$ varying sinusoidally as a function of time and about the value $(\omega 2moy)^2$.

The second capacitance C2 has a substantially constant value. By "substantially constant value", what is meant is the value of this capacitance excluding variations therein related to temperature or to wear or any other physical factor.

The predetermined frequency is equal to twice the natural frequency of the transmitter resonant circuit 2 to within a tolerance $\varepsilon$. This tolerance $\varepsilon$ is such that $\varepsilon = \sqrt{(((½) \times hL \times \omega 2moy)^2 - (R2'/L2')^2)}$.

Thus, the predetermined frequency is comprised between $(2 \times f2) - \varepsilon$ and $(2 \times f2) + \varepsilon$.

Such a predetermined frequency makes it possible to increase the amplitude of the electrical current flowing through the transmitter resonant circuit 2.

According to one implementation, the predetermined amplitude h$\omega$ of variation in angular frequency is strictly greater than $2 \times (R2'/L2') \times \sqrt{(L2' \times C2')}$.

One exemplary embodiment of the second inductance L2 is described with reference to FIG. 5.

The second inductance L2 is here formed by a solenoid 5 and an electronic voltage inverter 9 that are electrically connected in parallel.

The electronic voltage inverter 9 comprises power components, in particular IGBTs forming at least two arms.

The electronic voltage inverter 9 delivers an AC voltage controlled by means of a DC control voltage VDC.

The DC control voltage VDC is provided by a power supply able to deliver a power greater than or equal to the power to be transmitted via resonant inductive coupling.

Figure 5:
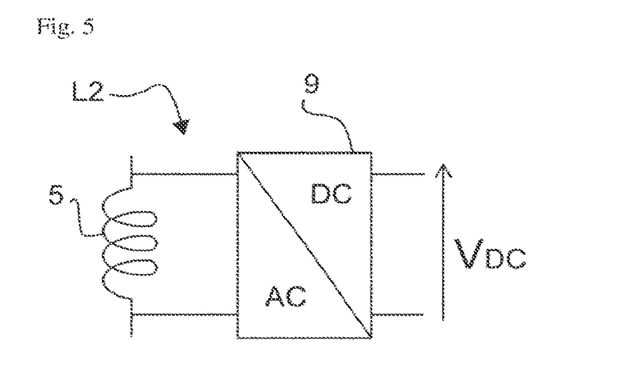
FIG. 5 is a schematic representation of a second inductance according to the invention.

In the example of FIG. 5, the solenoid 5 comprises a flat turn, or a plurality of turns extending concentrically and/or extending axially. The solenoid 5 may be produced using the stator 3, such as described with reference to FIG. 3, the rotor 6 being either absent or kept stationary.

Figure 6:
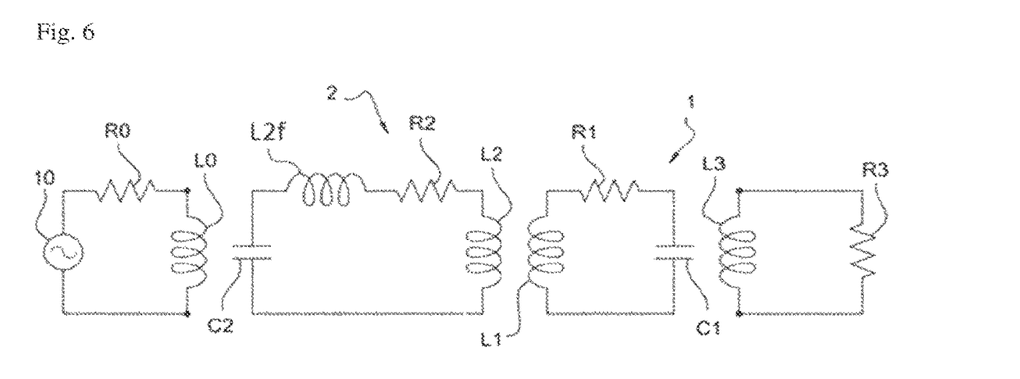
FIG. 6 is a schematic representation of a device for contactlessly transmitting power via resonant inductive coupling according to the invention.
Figure 7:
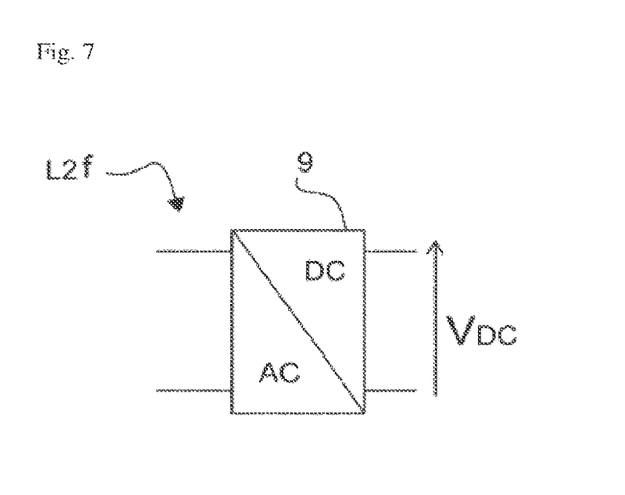
FIG. 7 is a schematic representation of a control inductance according to the invention.

In the example of FIGS. 6 and 7, the transmitter resonant circuit 2 further comprises a control inductance L2f of value L2f' connected in series with the second inductance R2 and the second capacitance C2. Leq=L2'+L2f'.

The second capacitance has a value C2', the control inductance has a value L2f', and the second resistance has a value R2'. Furthermore, the transmitter resonant circuit 2 has a natural angular frequency $\omega 2$ such that $\omega 2 = 1/\sqrt{((L2' + L2f') \times C2')}$ and a natural frequency f2 such that $f2 = \omega 2/(2\pi)$.

The inductance value L2f' of the control inductance L2f varies in a predetermined manner.

More precisely, the inductance value of the control inductance L2f varies at a predetermined frequency and with a predetermined amplitude hL of variation in inductance about a mean value L2$moy$, so that the natural angular frequency varies with a predetermined amplitude h$\omega$ of variation in angular frequency about a mean value $\omega 2moy$, with $\omega 2moy = 1/(L2moy \times C2')$.

The predetermined frequency is chosen so as to increase the amplitude of the AC electrical current flowing through the receiver resonant circuit 1 exponentially.

The inductance value L2f' of the control inductance L2f varies sinusoidally as a function of time about L2$moy$ and with an angular frequency equal to $2 \times \omega 2moy$, so as to increase the amplitude of the electrical current flowing through the receiver resonant circuit 1 exponentially.

As a variant, the inductance value L2f' of the control inductance L2f varies so that the square of the natural angular frequency $\omega 2$ varies sinusoidally as a function of time about $(\omega 2moy)^2$ and with an angular frequency equal to $2 \times \omega 2moy$, so as to increase the amplitude of the electrical current flowing through the receiver resonant circuit 1 exponentially.

In other words, according to the latter variant, the inductance value L2f' of the control inductance varies as a function of time according to $1/(C2' \times (\omega 2)^2)$, $(\omega 2)^2$ varying sinusoidally as a function of time and about the value $(\omega 2moy)^2$.

The second capacitance C2 has a substantially constant value. By "substantially constant value", what is meant is the value of this capacitance excluding variations therein related to temperature or to wear or any other physical factor.

The predetermined frequency is equal to twice the natural frequency of the transmitter resonant circuit 2 to within a tolerance $\varepsilon$. This tolerance $\varepsilon$ is such that $\varepsilon = \sqrt{(((½) \times hL \times \omega 2moy)^2 - (R2'/(L2' + L2f'))^2)}$.

Thus, the predetermined frequency is comprised between $(2 \times f2) - \varepsilon$ and $(2 \times f2) + \varepsilon$.

Such a predetermined frequency makes it possible to increase the amplitude of the electrical current flowing through the transmitter resonant circuit 2.

According to one implementation, the predetermined amplitude h$\omega$ of variation in angular frequency is strictly greater than $2 \times (R2'/(L2' + L2f')) \times \sqrt{((L2' + L2f') \times C2')}$.

One exemplary embodiment of the control inductance L2f is described with reference to FIG. 6.

The control inductance L2f is here formed by an electronic voltage inverter 9.

The electronic voltage inverter 9 comprises power components, in particular IGBTs forming at least two arms.

The electronic voltage inverter 9 delivers an AC voltage controlled by means of a DC control voltage VDC.

The DC control voltage VDC is provided by a power supply able to deliver a power greater than or equal to the power to be transmitted via resonant inductive coupling.

The terminals across which the AC voltage is delivered are the terminals forming the control inductance L2f, such as emulated by the electronic voltage inverter 9.

One exemplary embodiment of the second inductance L2 is described with reference to FIGS. 3 and 4.

The second inductance L2 is here formed by a variable-magnetic-reluctance assembly comprising a rotor 6 and a stator 3 with a gap between them, The stator 3 comprises a solenoid 5 and a plurality of stator arms 4, all of the stator arms 4 together forming a single magnetic pole when the solenoid 5 is passed through by an electrical current. The pole is here considered from the side of the gap. The rotor 6 comprises a plurality of rotor arms 7 forming a single magnetic pole when the solenoid 5 is passed through by an electrical current. The pole is here considered from the side of the gap.

Thus, the solenoid 5 forms a winding. The stator forms a portion that is fixed and the rotor forms a portion that is movable, relative to the winding.

Figure 3:
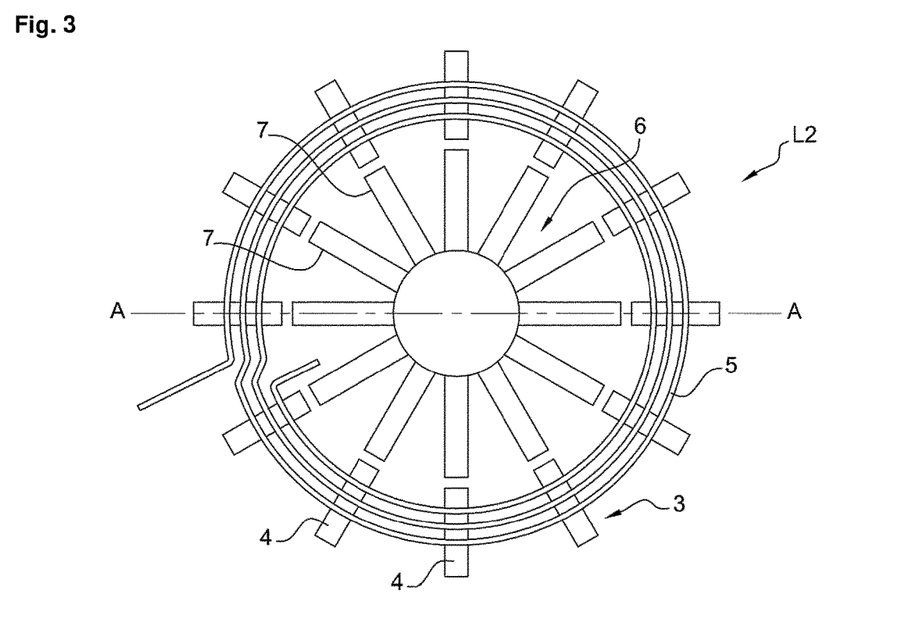
FIG. 3 is a schematic representation of a variable-magnetic-reluctance assembly according to the invention.

As may be seen in FIG. 3, two adjacent rotor arms 7 are separated pairwise by an amagnetic segment and two adjacent stator arms 4 are separated pairwise by an amagnetic segment. In the example in question, the number of stator arms 4 is equal to the number of rotor arms 7; in the present case, this number is equal to 12.

Thus, the stator 3 comprises a plurality of protrusions, all of the same polarity, this polarity, in the sense of the north or south orientation, being dependent on the phase of the current flowing through the solenoid 5.

Furthermore, the rotor 6 comprises a plurality of protrusions, all of the same polarity, this polarity, in the sense of the north or south orientation, being dependent on the phase of the current flowing through the solenoid 5. The stator 3 and the rotor 6 each have the same number of magnetic protrusions, separated by absences of magnetic material.

Each stator arm 4 extends in a radial direction with respect to the axis of rotation X of the rotor and comprises a bundle of laminated magnetic sheets that are stacked in an orthoradial direction with respect to the radial direction in which the stator arm 4 extends. In the example in question, the stack is stacked in an orthoradial direction with respect to the axis of rotation X of the rotor 6.

Each rotor arm 7 extends in a radial direction with respect to the axis of rotation X of the rotor and comprises a bundle of laminated magnetic sheets that are in particular stacked in an orthoradial direction with respect to the radial direction in which the rotor arm 7 extends. In the example in question, the stack is stacked in an orthoradial direction with respect to the axis of rotation X of the rotor.

The rotor 6 comprises a shaft 8 that is made of an amagnetic material. This allows the flux to pass only through the rotor arms 7 and not through the shaft 8, in an axial direction.

In the example in question, the amagnetic shaft 8 of the rotor 6 is neither laminated nor made of soft ferrite, in order to avoid the formation of disadvantageous induced currents in said shaft 8.

Figure 4:
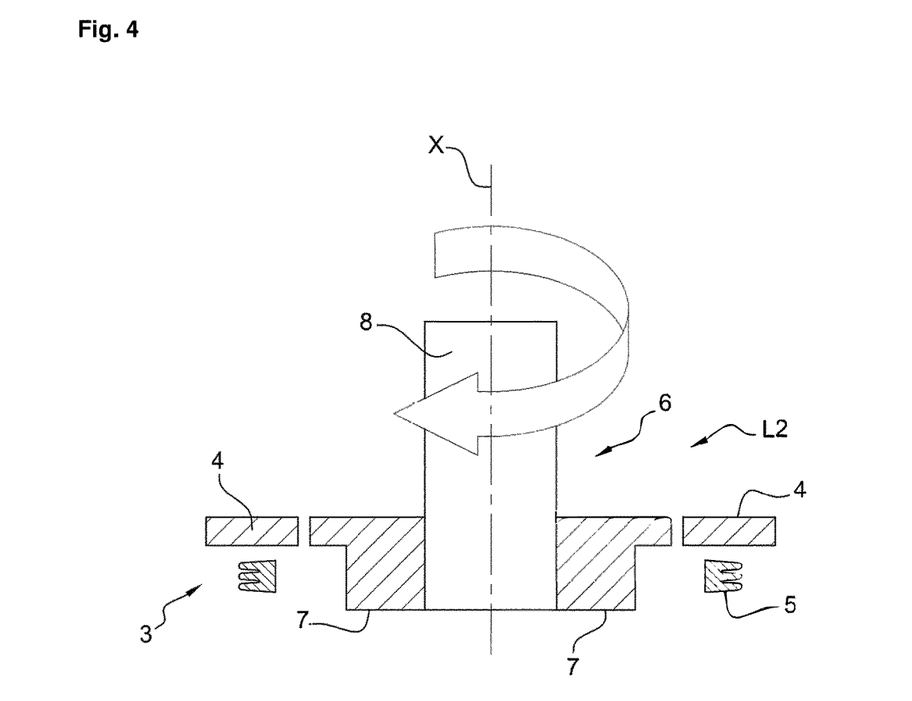
FIG. 4 is a schematic representation of the assembly of FIG. 3, along section A-A.

As may be seen in FIG. 4, each rotor arm 7 comprises a protruding segment, in particular placed radially on the side of the axis of rotation X of the rotor 6. This makes it possible to channel the magnetic flux while allowing the assembly forming the rotor 6 to be better held in place mechanically.

In the example of FIG. 3, the solenoid 5 comprises a plurality of turns extending concentrically. In the example of FIG. 4, the solenoid 5 may comprise a plurality of turns extending axially. As a variant (not shown), the solenoid 5 may comprise a single flat turn.

The turns are devoid of Litz wire. As a variant, the turns comprise Litz wire, the cross section of which has a diameter strictly larger than 0.2 mm, and in particular strictly larger than 0.3 mm.

The solenoid 5 is arranged so that an AC current flowing through the turns from which it is composed is of a frequency strictly lower than 3 kHz.

An electric motor (not shown) is coupled to the shaft 8 to allow the rotor 6 to be driven to rotate at a predetermined speed $\Omega$ expressed in revolutions/s and being such that $\Omega=((2\times f0)+/-\varepsilon)/(N)$, N being the number of stator arms 4. This predetermined speed is measured in the steady state, i.e. at the end of a transient electro-mechanical regime.

Of course, the above description has been given solely by way of example and does not limit the scope of the invention; replacing the various elements with any other equivalents would not constitute a departure from said scope.

Furthermore, the various features, variants and/or embodiments of the present invention may be associated with one another in various combinations, in so far as they are not mutually incompatible or mutually exclusive.

The invention claimed is:

1. A first resonant circuit being a transmitter or receiver, for carrying out contactless power transmission via resonant inductive coupling to a second resonant circuit being a transmitter or receiver, comprising:
   a first capacitance and a first winding, the first winding including an inductance and a first resistance,
   the first resonant circuit including a second capacitance of value C2' and a second winding, the second winding including a second inductance of value L2' and a second resistance of value R2',
   the first resonant circuit having a natural angular frequency $\omega 2$ such that $\omega 2=1/\sqrt{(Leq \times C2')}$, Leq being equivalent inductance of the first resonant circuit, and a natural frequency f2 such that $f2=\omega 2/(2\pi)$,
   wherein the equivalent inductance Leq varies in a predetermined manner,
   wherein the first resonant circuit further includes a control inductance of value L2f connected in series with the second inductance, Leq being equal to L2'+L2f.

2. The first resonant circuit as claimed in claim 1, wherein the first resonant circuit is arranged to be tuned to the second resonant circuit.

3. The first resonant circuit as claimed in claim 1, wherein the second inductance is formed by a variable-magnetic-reluctance assembly including a rotor and a stator with a gap between them,
   the stator includes a solenoid and a plurality of stator arms, all of the stator arms together forming a single magnetic pole when the solenoid is passed through by an electrical current, the pole in particular being considered from a side of the gap, and the rotor includes a plurality of rotor arms forming a single magnetic pole when the solenoid is passed through by an electrical current, the pole in particular being considered from the side of the gap.

4. The first resonant circuit as claimed in claim 1, wherein the second inductance is formed by a solenoid and an electronic voltage inverter that are electrically connected in parallel.

5. The first resonant circuit as claimed in claim 1, wherein the control inductance is formed by an electronic voltage inverter arranged to emulate electrical behavior of the control inductance and the value of the inductance $L2f'$.

6. The first resonant circuit as claimed in claim 1, wherein the second inductance includes a magnetic circuit, said magnetic circuit including at least one portion that is movable relative to the second winding, the movable portion being driven by an electric motor.

7. A device for contactlessly transmitting power via resonant inductive coupling, with a view to charging or recharging with electrical power a motor vehicle, comprising:
a power source, being an AC power source,
a second resonant circuit, forming a receiver resonant circuit, including a first capacitance and a first winding, the first winding including an inductance and a first resistance,
a first resonant circuit, forming a transmitter resonant circuit, the transmitter resonant circuit being energized by the power source,
wherein the receiver resonant circuit further includes a control inductance of value $L2f'$ connected in series with the second inductance, Leq being equal to $L2'+L2f'$, with Leq being equivalent inductance of the first resonant circuit.

8. A device for contactlessly transmitting power via resonant inductive coupling, with a view to charging or recharging with electrical power a motor vehicle, comprising:
a power source, being an AC power source,
a second resonant circuit, forming a transmitter resonant circuit, including a first capacitance and a first winding, the first winding including an inductance and a first resistance, the second circuit being energized by the power source, and
a first resonant circuit, the first resonant circuit forming a receiver resonant circuit,
wherein the receiver resonant circuit further includes a control inductance of value $L2f'$ connected in series with the second inductance, Leq being equal to $L2'+L2f'$, with Leq being equivalent inductance of the first resonant circuit.

9. A first resonant circuit being a transmitter or receiver, for carrying out contactless power transmission via resonant inductive coupling to a second resonant circuit being a transmitter or receiver, comprising:
a first capacitance and a first winding, the first winding including an inductance and a first resistance,
the first resonant circuit including a second capacitance of value $C2'$ and a second winding, the second winding including a second inductance of value $L2'$ and a second resistance of value $R2'$, the first resonant circuit having a natural angular frequency $\omega 2$ such that $\omega 2=1/\sqrt{(Leq \times C2')}$, Leq being equivalent inductance of the first resonant circuit, and a natural frequency f2 such that $f2=(2\pi)$,
wherein the equivalent inductance Leq varies in a predetermined manner,
wherein, in a case where Leq=L2', the value of the second inductance varies at a predetermined frequency and with a predetermined amplitude hL of variation in inductance about a mean value $L2moy$, so that the natural angular frequency varies with a predetermined amplitude $h\omega$ of variation in angular frequency about a mean value $\omega 2moy$, with $\omega 2moy=1/\sqrt{(L2moy \times C2')}$.

10. The first resonant circuit as claimed claim 9, wherein the predetermined frequency is chosen to increase the amplitude of electrical current flowing through the transmitter resonant circuit exponentially.

11. The first resonant circuit as claimed in claim 9, wherein the predetermined frequency is equal to twice the natural frequency of the transmitter resonant circuit to within a tolerance E, the tolerance in particular being such that $\varepsilon$ is such that $\varepsilon=\sqrt{((1/2) \times hL \times \omega 2moy)^2-(R2'/L2')^2)}$.

12. The first resonant circuit as claimed in claim 9, wherein the predetermined amplitude of variation in angular frequency is strictly greater than $2\times(R2'/L2')\times\sqrt{(L2'\times C2')}$.

13. The first resonant circuit as claimed in claim 9, wherein the first resonant circuit is arranged to be tuned to the second resonant circuit.

14. The first resonant circuit as claimed in claim 10, wherein the predetermined frequency is equal to twice the natural frequency of the transmitter resonant circuit to within a tolerance $\varepsilon$, the tolerance in particular being such that $\varepsilon$ is such that $\varepsilon=\sqrt{((1/2) \times hL \times \omega 2moy)^2-(R2'/L2')^2)}$.

15. The first resonant circuit as claimed in claim 10, wherein the predetermined amplitude of variation in angular frequency is strictly greater than $2\times(R2'/L2')\times\sqrt{(L2'\times C2')}$.

16. The first resonant circuit as claimed in claim 9, wherein the second inductance is formed by a variable-magnetic-reluctance assembly including a rotor and a stator with a gap between them,
the stator includes a solenoid and a plurality of stator arms, all of the stator arms together forming a single magnetic pole when the solenoid is passed through by an electrical current, the pole in particular being considered from a side of the gap, and
the rotor includes a plurality of rotor arms forming a single magnetic pole when the solenoid is passed through by an electrical current, the pole in particular being considered from the side of the gap.

17. The first resonant circuit as claimed in claim 9, wherein the second inductance is formed by a solenoid and an electronic voltage inverter that are electrically connected in parallel.

18. The first resonant circuit as claimed in claim 9, wherein the second inductance includes a magnetic circuit, said magnetic circuit including at least one portion that is movable relative to the second winding, the movable portion being driven by an electric motor.

19. The first resonant circuit as claimed in claim 10, wherein the first resonant circuit is arranged to be tuned to the second resonant circuit.

* * * * *